Sept. 11, 1962　　　R. F. MERKLE　　　3,052,995
DANCING TAP
Filed Jan. 31, 1961

INVENTOR.
RAYMOND F. MERKLE
BY
John F. A. Earley Jr.
ATTORNEY

3,052,995
DANCING TAP
Raymond F. Merkle, Philadelphia, Pa., assignor to Twin Tone Tape Company, Inc., Philadelphia, Pa., a corporation of Pennsylvania
Filed Jan. 31, 1961, Ser. No. 86,151
6 Claims. (Cl. 36—8.3)

This invention relates to improvements in taps for dancing shoes, and more particularly concerns a dancing tap having a floating element or sound producing disc supported in a base member.

Dancing taps of the general type of the present invention are disclosed in U.S. Patents No. 2,443,609 and No. 2,443,727 which issued on June 22, 1948, to F. J. Du Mont et al. The present invention is an improvement over the dancing taps shown in the aforesaid patents.

It is an object of this invention to provide a dancing tap which eliminates drilled and tapped holes, and thereby reduces the cost of manufacture.

It has previously been proposed to provide a floating element which contained a drilled hole in which was seated a helical spring and a pin having a narrow shank which projected outwardly from the drilled hole and the floating element. The metal of the floating element was peened over, or compressed around, the narrow shank of the pin to retain the pin within the drilled hole against the action of the spring. The base member was provided with a drilled hole which was adapted to receive the shank of the pin. This construction had several disadvantages and gave rise to a number of problems.

The pins were made of cold rolled steel, were machined, and were therefore expensive. If the drilled holes in the floating element and in the frame base member were not drilled so that their axes coincided, the walls of the holes would exert pressure on the pin, eventually causing it to break.

If the holes were not drilled on center and the pin had to be bent to make the shank of the pin enter the receiving hole on the base member, the floating element would not float freely and would not emit the desired tap sound when in use. During manufacture, the dancing taps would be inspected after assembly and such improperly made taps would be rejected. These rejects increased costs, and the machining of the pins and the drilling of the holes were also expensive operations.

Accordingly, it is an object of this invention to eliminate the expensive machining and drilling, and also to eliminate rejects caused by the holes not being drilled precisely.

It is another object to eliminate the operation of peening the metal of the floating element around the shoulder of the pin. This peening operation would sometimes deform the pin itself, and upon inspection would cause the tap to be rejected since the pin would not retract.

Another problem arose in drilling the floating element hole so as to properly position it relative to the top and bottom of the floating element. While being drilled, the floating element is supported on a punch press table, and if there is a burr on the floating element that elevates it slightly, the hole would be drilled in the wrong place. Then the pin would have to be bent so that its shank would be in position to enter the receiving hole in the frame base member, and such bending would prevent it from sliding back and forth in the floating element hole.

In previous dancing taps, the frame base member was attached to the heel of the shoe by screws. If the screws were not screwed in straight, the head of the screw would stick up slightly because of being screwed in at an angle. In some cases, the angled screw heads would make contact with the floating element and prevent it from freely floating. It is an object of this invention to provide a dancing tap which overcomes this difficulty.

Other objects and advantages of this invention, including its simplicity and economy, will further become apparent hereinafter and in the drawings, in which.

Figure 1:
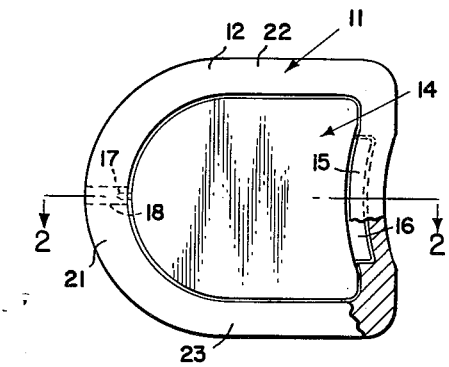
FIG. 1 is a view in bottom plan of a dancing tap constructed in accordance with this invention.
Figure 3:
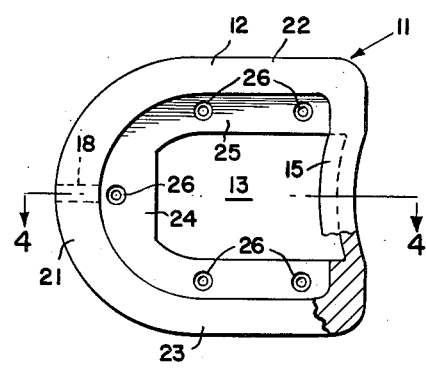
FIG. 3 is a view in bottom plan of the base element of the present invention.
Figure 2:
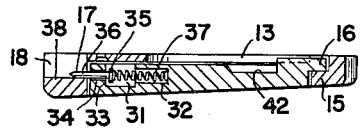
FIG. 2 is a view in section taken as indicated by the lines and arrows 2—2 which appear in FIG. 1.
Figure 4:
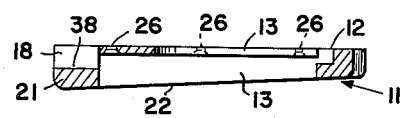
FIG. 4 is a view in section taken as indicated by the lines and arrows 4—4 which appear in FIG. 3.

Although specific terms are used in the following description for clarity, these terms are intended to refer only to the structure shown in the drawings and are not intended to define or limit the scope of the invention.

Turning now to the specific embodiment of the invention selected for illustration in the drawings, there is shown a base member 11 having a frame 12 defining a frame opening 13, a floating sound producing element 14 positioned in frame opening 13, a ledge 15 extending inwardly from the bottom of frame 12, a tongue 16 extending outwardly from floating element 14 and floatingly supported on ledge 15, and a pin 17 extending outwardly from floating element 14 into a receiving slot 18 in frame 12.

Frame 12 is provided with an arcuate end 21 and a pair of arms 22, 23 extending therefrom substantially conforming to the outline of a portion of a shoe, and a cross piece 24 connecting the other ends of arms 22, 23 together to define frame opening 13. The outer perimeter of frame 12 may be constructed so as to substantially conform to the outline of the heel of a shoe to serve as a heel tap, or may be constructed so as to substantially conform to the outline of the toe of a shoe to serve as a toe tap.

A marginal flange 25 extends inwardly from the top inner edge of frame 12 and is provided with countersunk fastener openings 26, which are adapted to receive clinch nails or screws. Clinch nails are preferable since they are less expensive and securely lock the frame 12 to the bottom of the shoe.

Floating element 14 is positioned in frame opening 13 and has a perimeter substantially conforming therewith. The top of floating element 14 is provided with a die-cast slot 31 formed therein, with the inner end of slot 31 having a blind hole 32 extending inwardly therefrom. The outer end 33 of slot 31 is provided with a through hole 34. Blind hole 32 has only one opening, and through hole 34 has two openings, as shown in the drawings. Pin 17 has its head 35, which is wider than the through hole 34, positioned in slot 31 and its shank 36 positioned in through hole 34.

A spring 37 is seated in blind hole 32 and abuts against head 35 of pin 17 to urge it outwardly into die-cast receiving slot 18 in frame 12.

Receiving slot 18 has a bottom wall 38, which supports shank 36 of pin 17, and two side walls, with the bottom of the shoe forming the top wall.

If the nails and screws inserted in fastener openings 26 to attach frame 12 to the bottom of the shoe are not inserted straight but are instead canted at an angle, in previous devices they would make contact with floating element 14 and prevent its proper operation. To overcome this difficulty, floating element 14 is provided with counter sinks or recesses 41 formed in its top face, so that if the heads of the nails or screws are canted at an angle, they swim in the counter sinks 41 (the canted head are positioned within the recesses or counter sinks 41 when the upper surface of floating element 14 makes contact with flange 25 of frame 12), and do not make contact with floating element 14. Accordingly, they do not inhibit the free motion of floating element 14.

In assembly, base member 11 and floating element 14 are die-cast and receiving slot 18 and floating element slot 31 are formed by this die-casting operation. Accordingly, the positions of slots 18 and 31 are the same in all of the dancing taps of this invention. Pin 17 is an ordinary nail, which is made of mild steel and does not break, whereas in previous devices the pin was made of cold rolled steel which was more brittle and would break from time to time.

The precise positioning of die-cast floating element slot 31 makes easy the drilling of through hole 34 and blind hole 32 from the outer perimeter of floating element 14, and the precise positioning of receiving slot 18 eliminates any difficulty of introducing shank 36 of pin 17 into receiving slot 18. The diameter of hole 32 is a few thousandths of an inch wider than spring 37, to allow for lateral expansion of spring 37 as it compresses.

In assembly, pin 17 is picked up with a pencil having a magnet on the end and its shank 36 is pushed through hole 34 so as to assume its proper position with head 35 within slot 31 and shank 36 protruding from hole 34. Head 35 prevents pin 17 from going through hole 34, and this arrangement eliminates the swedging operation which was necessary in previous devices in order to peen the metal of the floating element around the shank of the pin, and eliminates the cleaning operation after swedging.

Spring 37 is inserted into blind hole 32 which is about as long as slot 31. Spring 37 is normally (in expanded condition) about twice as long as slot 31 so that it is securely seated in blind hole 32 with no place to go except forwardly, which forward motion is obstructed by head 35 of pin 17. To further insure that spring 37 does not pop out of its seat, flange 25 of base member 11 forms a top wall for slot 31 so as to completely enclose the free end of spring 37.

Formed in the top of floating element 14 is a sound chamber 42 which aids in providing the dancing tap with the proper tap sound when floating element 14 strikes portions of frame 12.

Figure 8:
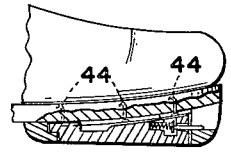
FIG. 8 is a view partly in section illustrating the assembled dancing tap attached to the toe of a shoe.
Figure 5:
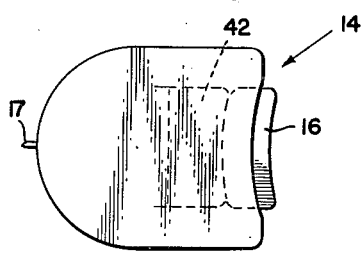
FIG. 5 is a view in bottom plan of the floating element of the present invention.
Figure 7:
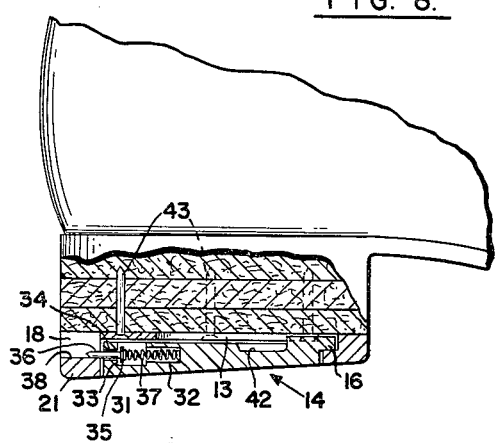
FIG. 7 is a view partly in section illustrating the assembled dancing tap of the present invention attached to the heel of a shoe.
Figure 6:
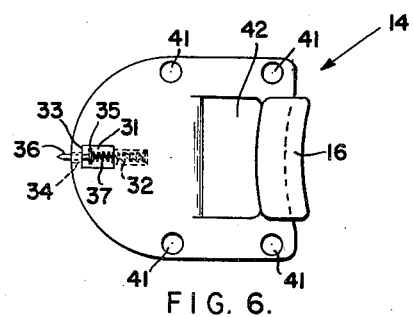
FIG. 6 is a view in top plan of the floating element of FIG. 5.

In FIG. 7, clinch nails 43 are straight because the shoe heel is thicker than the length of the nails, but in FIG. 8, clinch nails 44 are longer than the thickness of the shoe sole and have their shanks bent over to securely anchor the tap to the shoe. The toe and heel taps are attached by mounting the shoe on a metal last, such as may be seen in a shoe repair shop, and hammering the nails toward the metal last. Hammering nails 44 into the sole of the shoe causes the shanks of the nails to make contact with the metal last, which contact bends over the shanks.

From the foregoing, it is seen that the dancing tap constructed in accordance with the present invention has the advantage of being constructed with greater precision and accuracy in that the receiving slot 18 and floating element slot 31 are precisely positioned in the die-casting operation, whereas in previous devices utilizing drilled holes, the drilled holes might be accurately or inaccurately positioned according to the skill of the driller.

In the drilled holes of previous devices, the only part of the hole that did any work was the bottom, since, because of gravity, the pin would rest thereon. Accordingly, the slots of the present invention serve just as well in this respect because they provide a bottom 38 which supports the pin just as the drilled hole did.

Vibration caused by dancing does not cause pin 17 to loosen and withdraw from receiving slot 18, as may be the case with prior screw and tapped hole arrangements.

Receiving slot 18 and floating element slot 31 are properly positioned relative to each other so as to eliminate any bending of pin 17 which might prevent the free movement of shank 36 in hole 34 in assembling the dancing tap, or in disassembling the dancing tap when desired, as for replacement of worn parts.

Restriction of motion of the floating element 14 caused by canted screw heads has been eliminated by the provision of counter sinks 41 in which the canted heads swim without making contact with floating element 14.

It is to be understood that the form of the invention herewith shown and described is to be taken as a preferred embodiment. Various changes may be made in the shape, size and arrangement of parts. For example, equivalent elements may be substituted for those illustrated and described, parts may be reversed, and certain features of the invention may be utilized independently of the use of other features, all without departing from the spirit or scope of the invention as defined in the subjoined claims.

The claimed invention:

1. In a tap for dancing shoes and the like, a base member having a frame with an arcuate end and a pair of arms extending therefrom substantially conforming to the outline of a portion of a shoe and a cross piece connecting the other ends of said arms together to define a frame opening, a marginal flange extending from the top inner edge of the frame and having fastener openings formed therein, a floating sound producing element positioned in the frame opening and having a perimeter substantially conforming therewith, a ledge extending inwardly from the bottom of said frame, a tongue extending outwardly from said floating element and adapted to seat on said ledge but free to move upwardly therefrom, the top of said floating element having a slot formed therein, the inner end of said slot having a hole extending inwardly therefrom, the outer end of said slot having a through hole extending outwardly therefrom, a pin with its head wider than said through hole positioned with its head in said slot and its shank in said through hole, a spring seated in the first said hole and abutting against the head of said pin to urge it outwardly, and the top of said frame having a receiving slot with a bottom wall and two side walls and an opening in its inner end for receiving the shank of said pin.

2. The tap for dancing shoes defined in claim 1, wherein said floating element has recesses formed in its top opposite said fastener openings in said flange, whereby canted heads of fasteners are positioned in said recesses when said floating element contacts said marginal flange and are prevented from contacting said floating element and from inhibiting its free motion.

3. In a tap for dancing shoes, a base member having a frame defining a frame opening, a floating element positioned in said frame opening, a ledge extending outwardly from said floating element and floatingly supported by said ledge, the top of said floating element having a die-cast slot formed therein, the inner end of said slot having a blind hole extending inwardly therefrom, the outer end of said slot having a through hole extending outwardly therefrom, a pin with its head wider than said through hole positioned with its head in said slot and its shank in said through hole, a spring seated in said blind hole and abutting against the head of said pin to urge it outwardly, and the top of said frame having a die-cast receiving slot with a bottom wall and two side walls and an opening in its inner end for receiving the shank of said pin and thereby floatingly to support said floating element in said base member.

4. In a tap for dancing shoes, a base member having a frame defining a frame opening, a floating element positioned in said frame opening, a ledge extending inwardly from the bottom of said frame, a tongue extending outwardly from said floating element and floatingly supported by said ledge, the top of said floating element having a die-cast slot formed therein, the inner end of said slot having a blind hole extending inwardly therefrom, the outer end of said slot having a through hole extending outwardly therefrom, a pin with its head wider than said through hole positioned with its head in said slot and its shank in said through hole, a spring seated in said blind hole and abutting against the head of said pin to urge it outwardly, and said frame being provided with an opening for receiving the shank of said pin and thereby floatingly to support said floating element in said base member.

5. In a tap for dancing shoes, a base member having a frame defining a frame opening, a floating element positioned in said frame opening, a ledge extending inwardly from the bottom of said frame, a tongue extending outwardly from said floating element and floatingly supported by said ledge, a retractable pin extending from said floating element, and the top of said frame having a die-cast receiving slot with a bottom wall and two side walls and an opening in its inner end for receiving the shank of said pin and thereby floatingly to support said floating element in said base member.

6. In a tap for dancing shoes, a base member having a frame defining a frame opening, a floating element positioned in said frame opening, a ledge extending inwardly from the bottom of said frame, a tongue extending outwardly from said floating element and floatingly supported by said ledge, said floating element having a slot formed therein, the outer end of said slot having a through hole extending outwardly therefrom, a pin with its head wider than said through hole positioned with its head in said slot and its shank in said through hole, means abutting against the head of said pin to urge it outwardly, and said frame being provided with an opening for receiving the shank of said pin and thereby floatingly to support said floating element in said base member.

References Cited in the file of this patent

UNITED STATES PATENTS

| | | |
|---|---|---|
| 1,943,222 | Landi | Jan. 9, 1934 |
| 2,443,609 | Dumont et al. | June 22, 1948 |
| 2,443,727 | Dumont et al. | June 22, 1948 |
| 2,479,428 | Sunseri | Aug. 16, 1949 |
| 2,708,321 | Cathers et al. | May 17, 1955 |
| 2,723,467 | Cassidy | Nov. 15, 1955 |

UNITED STATES PATENT OFFICE
CERTIFICATE OF CORRECTION

Patent No. 3,052,995                              September 11, 1962

Raymond F. Merkle

It is hereby certified that error appears in the above numbered patent requiring correction and that the said Letters Patent should read as corrected below.

In the grant, lines 2 and 12, and in the heading to the printed specification, lines 3 and 4, name of assignee for "Twin Tone Tape Company, Inc.", each occurrence, read -- Twin Tone Tap Company, Inc. --; column 3, line 13, for "head" read -- heads --; column 4, line 5, for "bottom 38" read -- bottom bearing-surface 38 --.

Signed and sealed this 1st day of January 1963.

(SEAL)
Attest:

ERNEST W. SWIDER
Attesting Officer

DAVID L. LADD
Commissioner of Patents